Figure 1:
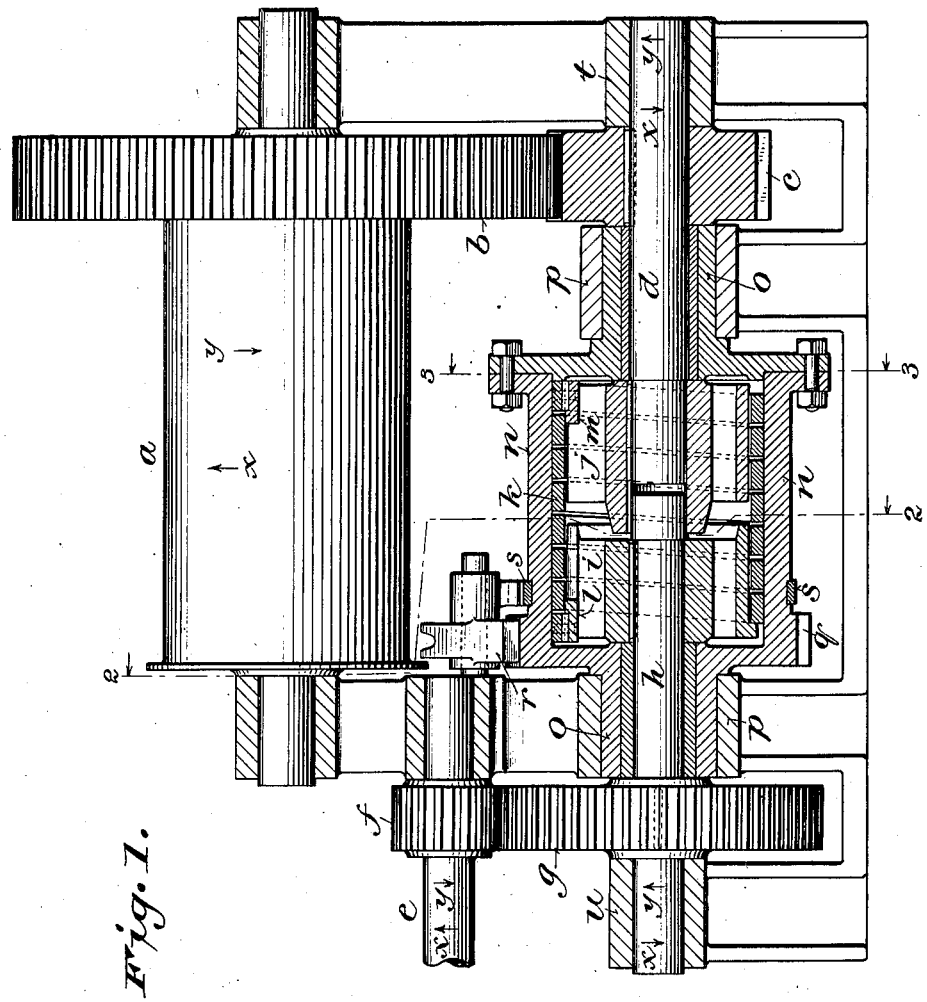

H. WEICKEL & H. E. FRENTZEL.
LOAD BRAKE.
APPLICATION FILED MAR. 8, 1909.

933,866.

Patented Sept. 14, 1909.
3 SHEETS—SHEET 1.

Witnesses:
Inventors:
Attorneys.

H. WEICKEL & H. E. FRENTZEL.
LOAD BRAKE.
APPLICATION FILED MAR. 8, 1909.
933,866.
Patented Sept. 14, 1909.
3 SHEETS—SHEET 2.
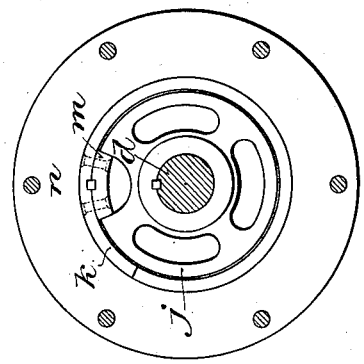
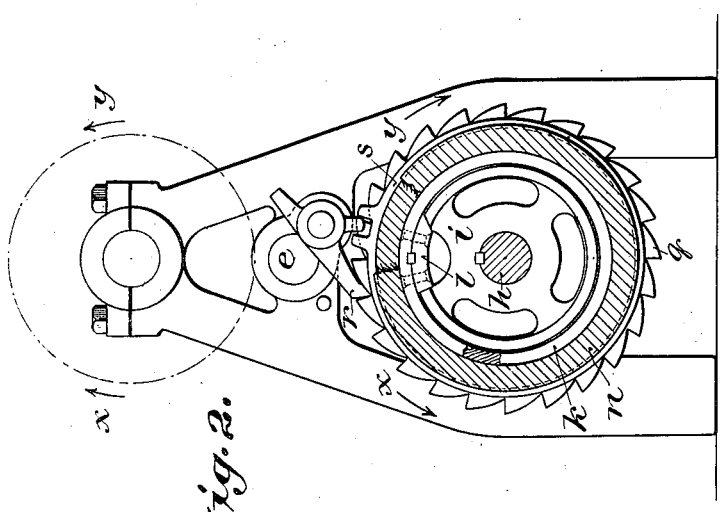

H. WEICKEL & H. E. FRENTZEL.
LOAD BRAKE.
APPLICATION FILED MAR. 8, 1909.
933,866.
Patented Sept. 14, 1909.
3 SHEETS—SHEET 3.
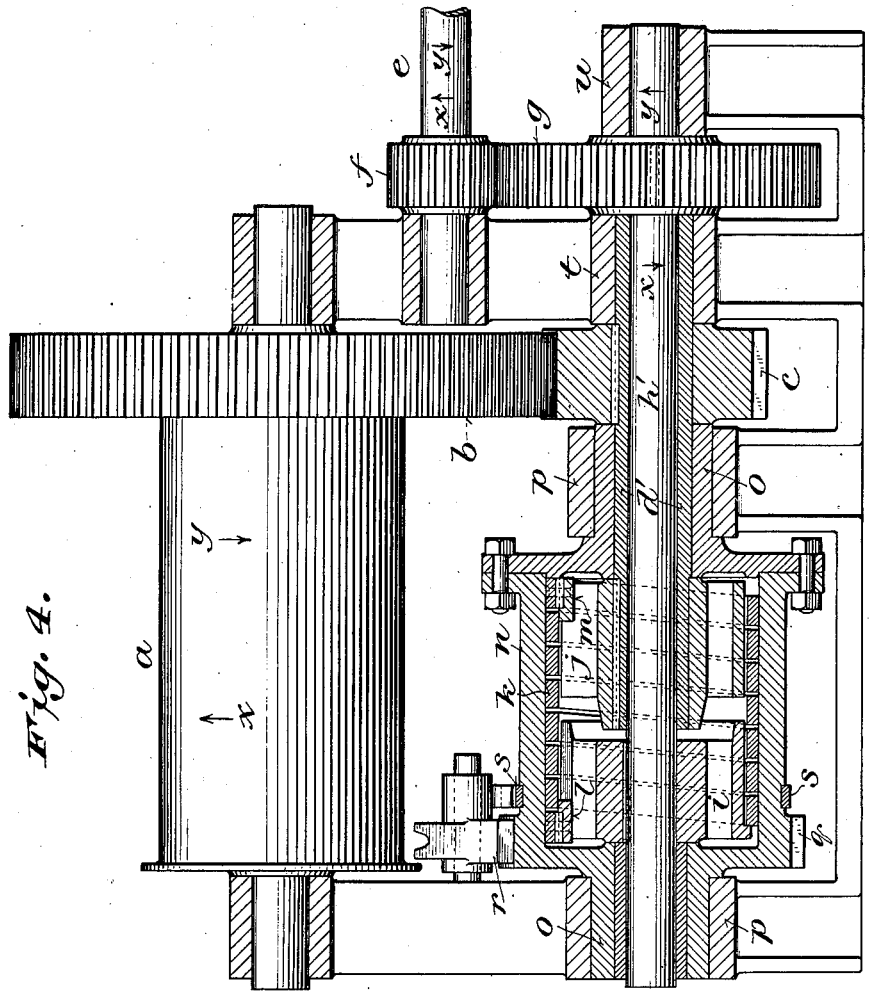
Witnesses:
Inventors:
Attorneys.

UNITED STATES PATENT OFFICE.

HENRY WEICKEL AND HERMAN E. FRENTZEL, OF MILWAUKEE, WISCONSIN, ASSIGNORS TO PAWLING & HARNISCHFEGER, OF MILWAUKEE, WISCONSIN, A COPARTNERSHIP.

LOAD-BRAKE.

933,866.

Specification of Letters Patent.   Patented Sept. 14, 1909.

Application filed March 8, 1909.   Serial No. 482,056.

*To all whom it may concern:*

Be it known that we, HENRY WEICKEL and HERMAN E. FRENTZEL, citizens of the United States, residing at Milwaukee, in the county of Milwaukee and State of Wisconsin, have invented certain new and useful Improvements in Load-Brakes, of which the following is a specification, reference being had to the accompanying drawing, forming a part thereof.

This invention relates to improvements in brakes of the kind described in United States Letters Patent No. 697,393, dated April 8, 1902, for automatically controlling the movement of the load of hoisting apparatus through the operation of the motor. Its main objects are to prevent bending of the brake shaft and the consequent binding or cramping of relatively movable parts of the brake whereby its action is rendered sluggish and uncertain; and generally to improve the construction and operation of brakes of this class.

It consists in the peculiar construction, arrangement and combination of parts as hereinafter particularly described and pointed out in the claims.

In the accompanying drawing like characters designate the same parts in the several figures.

Figure 1 is an axial section of a load brake embodying the invention in connection with hoisting apparatus; Fig. 2 is a vertical cross section of the brake on the line 2 2, Fig. 1; Fig. 3 is a similar section on the line 3 3, Fig. 1; and Fig. 4 is an axial section showing a modification of the brake as applied to hoisting apparatus.

The successful operation of a load brake of the kind shown and described in the above mentioned Letters Patent depends upon a free rotary movement within narrow limits of one member of the brake relative to the other, this limited movement being required to expand or contract the spiral friction band within the inclosing shell, thus increasing or reducing the frictional engagement between these two parts to lift the load when the motor is run forward, or to allow the load to descend when the motor is run backward. With load brakes of this type as ordinarily constructed, when a heavy load is suspended from the hoisting drum, the lateral pressure of the gear teeth between the hoisting drum and brake shaft and the lateral pressure of the pawl engaging the ratchet teeth or wheel on the shell, produce friction between the brake shaft and the parts of the brake which turn thereon, and tend to bend the brake shaft between its bearings. The bending of the brake shaft in this manner causing it to bind or cramp in the parts of the brake which are designed to turn freely thereon, together with the friction produced by the lateral pressure of the gear teeth and pawl as above mentioned, resists or interferes with the limited independent movement of the brake members, rendering the operation of the brake sluggish and uncertain and permitting the load to descend when it should not.

The improvements constituting the present invention are designed to prevent the bending and binding of the brake shaft and to insure the free movement of the brake members relative to each other requisite to the proper and reliable action of the brake.

Referring to the drawing, and more particularly to Fig. 1, $a$ designates a hoisting drum provided with a gear $b$ meshing with a pinion $c$ which is fixed on the brake shaft $d$. $e$ is a motor or driving shaft provided with a pinion $f$ meshing with a gear $g$ which is fixed on the brake shaft $h$ in line with the shaft $d$. On the shaft $h$ is keyed or otherwise fixed a head $i$ which may be called the driving member, and on the shaft $d$ is keyed or otherwise fixed a head $j$ which may be called the driven member. $k$ is a spiral friction band connecting the heads or members $i$ and $j$ to which it is fastened at or near its ends, as shown in Figs. 2 and 3, by blocks $l$ and $m$ riveted or otherwise secured to the inner side of the band and fitted in recesses in the members $i$ and $j$. The rims of the members $i$ and $j$, which are of cylindrical form, are extended to afford an internal support for the friction band. A friction shell or cylinder $n$ surrounding the spiral band $k$, which is closely fitted therein, is provided at the ends with outwardly extending hubs or trunnions $o$, which are fitted to turn in bearings $p$ in the frame and which in turn form bearings for the shafts $d$ and $h$ passing through them. One of the heads of the shell or cylinder $n$ with one of the trunnions, is made detachable as shown, for the purpose of assembling the parts of the brake.

The block $l$ is beveled at one end and the opposing side or face of the recess in the head $i$ in which it is inserted is correspondingly beveled, as shown in Fig. 2, to thrust the adjacent end of the band $k$ outward and insure its initial engagement with the shell $n$ when the motor is started forward to lift a load. The shell or cylinder $n$ is formed or provided at one end with a ratchet wheel or teeth $q$, and a pawl $r$ is pivoted on the frame in position to engage with the ratchet wheel or teeth and prevent rotation of the shell or cylinder $n$ backward when the motor is reversed for lowering the load. Means are provided, such as a friction ring $s$, on the shell or cylinder $n$, with lugs engaging a tooth on the hub of the pawl, as shown in Fig. 2, for turning and holding the pawl out of engagement with the ratchet teeth when the shell or cylinder is turned forward with the motor in lifting the load. The shaft $h$ projects from the hub of the head $i$ which is fixed thereon, into the hub of the head $j$ which affords a bearing therefor and holds it in alinement with the shaft $d$.

By the provision of bearings $p$ for the hubs or trunnions $o$ as shown and described, the friction shell or cylinder $n$ is firmly supported adjacent to its ends independently of the shafts $d$ and $h$. The shaft $d$, which has a bearing $t$ in the frame, is firmly supported close to and at both ends of the pinion $c$, and the shaft $h$ which has a bearing $u$ in the frame, is supported close to and at both ends of the gear $g$. The tendency of the lateral pressure of the gear teeth and of the pawl and ratchet teeth when the brake is subjected to a load, to bend the shafts $d$ and $h$, thereby causing them to bind or cramp in their bearings and to interfere with the free and proper action of the heads or members $i$ and $j$ and the friction band $k$ is thus avoided or counteracted.

On the several figures of the drawings the arrows designated $x$, indicate the direction of the rotation of parts of the mechanism for lifting the load, while the arrows designated $y$, indicate the direction of rotation for lowering the load.

In connection with hoisting apparatus as herein shown and described, the brake operates as follows: In lifting a load, the motor or driving shaft being turned forward in the direction indicated by arrows $x$, tends to turn the head $i$ independently of the head $j$, and operates primarily by the engagement of the beveled face in the recess of the head $i$ with the beveled end of the block $l$ to force the adjacent end of the band $k$ outward against the shell or cylinder $n$, thereby insuring initial engagement of said band with said shell. The load acting on the drum $a$ through its connections with the brake, tends to turn the head $j$ in the reverse direction, indicated by arrows $y$, and thus to expand the friction band $k$ and hold it in fast frictional engagement with the shell $n$. The heads $i$ and $j$ with the connecting band $k$ are thus locked together in the shell $n$, and turning therewith as a unit, the forward movement of the motor is transmitted through the brake and its connections to the hoisting drum $a$ which lifts the load. The frictional engagement between the band $k$ and the shell $n$ varies according to the load. The greater the load the greater will be the force tending to expand the band and to hold it in fast engagement with the shell. When the shell $n$ starts forward, being free to turn in that direction as indicated by arrows $x$, the friction ring $s$ turning with it, throws the pawl $r$ out of engagement with the ratchet teeth and then slips on the shell. To lower the load the motor or driving shaft $e$ is reversed, and turning the head $i$ backward as indicated by arrows $y$, tends to contract the friction band $k$ from that end of the brake, while the load acting in the reverse direction on the head $j$ tends to expand the bands from that end of the brake. The initial backward movement of the shell or cylinder $n$ caused by the load as soon as the motor or driving shaft is stopped or its motion is reversed, operates through the friction ring $s$ to instantly throw the pawl $r$ back into engagement with the ratchet wheel or teeth $q$, thereby preventing further backward movement of said shell or cylinder. The backward rotation of the head $i$ tending to contract the band $k$, reduces the frictional engagement between said band and the surrounding shell or cylinder $n$, permitting the band with the head $j$ to slip and turn in said shell or cylinder and the load to descend at a rate of speed determined by that of the motor or driving shaft. If the motor or driving shaft is stopped, or its speed is diminished or increased, the descent of the load will be instantly stopped or accelerated or retarded accordingly by the movement of one of the heads $i$ and $j$ relative to the other, and the consequent expansion or contraction of the band $k$ in the shell or cylinder $n$. Thus the movement of the load in descending as well as in ascending is positively controlled by the operation of the motor, a positive backward movement of which is necessary to permit the load to descend.

Referring to Fig. 4, showing a modification of the machine, the pinion $c$ and the head or driven member $j$ of the brake are mounted on a tubular shaft or sleeve $d'$, which like the shaft $d$ is journaled in and supported by one of the trunnions $o$ of the brake shell or cylinder $n$. The head or driving member $i$ is mounted on a solid shaft $h'$ which passes through and is supported in the tubular shaft or sleeve $d'$. In this modification the motor or driving shaft $e$ with its pinion $f$, the gear $g$ and the bearing $u$ are located at the opposite end of the machine. In other respects the machine is substantially like that shown in Fig. 1 both as to the construction and arrangement of its parts, and in operation.

Various modifications in details of construction and arrangement of parts other than those specifically mentioned may be made without departing from the principle and contemplated scope of the invention.

We claim:

1. In a load brake the combination of independently rotatable heads arranged in axial alinement with each other, a spiral friction band connected adjacent to its ends with said heads, a friction cylinder surrounding said band and provided at the ends with hubs in which said heads are journaled, and bearings in which said hubs are journaled and supported independently of the journals of said heads.

2. In a load brake the combination of rotary heads fixed on separate shafts, a spiral friction band connecting said heads, a friction cylinder surrounding said band and provided at the ends with hubs in which said shafts are journaled, and bearings in which said hubs are supported.

3. In a load brake the combination of independently rotatable heads arranged in axial alinement with each other, a spiral friction band fastened to and connecting said heads, a friction cylinder surrounding said band and provided with ratchet teeth and at the ends with hubs in which said heads are journaled, bearings in which said hubs are supported, a pawl adapted by engagement with said ratchet teeth to hold said friction cylinder against turning in one direction, and a friction ring mounted on said cylinder and adapted to throw said pawl out of engagement with said ratchet teeth when the cylinder is turned in the other direction.

4. The combination with a driving shaft and a hoisting drum, of independently rotatable shafts arranged in axial alinement with each other, gears connecting said shafts one with the driving shaft and the other with said drum, heads fixed on said shafts, a spiral friction band connected adjacent to its ends with said heads, a friction cylinder surrounding said band and provided at the ends with hubs in which said shafts are journaled and supported, and bearings in which said hubs are journaled and supported independently of said shafts.

5. In a load brake the combination of shafts arranged end to end in axial alinement, heads fixed on said shafts, the hub of one head projecting beyond the shaft on which it is fixed over the adjacent end of the other shaft for which it forms a bearing, a spiral friction band connected adjacent to its ends with said heads, a friction cylinder surrounding said band and provided at the ends with hubs in which said shafts are supported, and bearings in which said hubs are journaled and supported independently of said shafts.

6. In a load brake the combination of two shafts arranged in axial alinement with each other, a friction shell or cylinder provided with ratchet teeth and at the ends with hubs in which said shafts are journaled, bearings in which said hubs are supported independently of said shafts, a pawl adapted by engagement with said ratchet teeth to prevent backward rotation of said shell or cylinder, heads fixed on said shafts within said shell or cylinder, and a spiral friction band fitted in said shell or cylinder and connected adjacent to its ends with said heads.

7. The combination with a hoisting drum, of shafts arranged in axial alinement with each other, gears connecting one of said shafts with said drum, a friction shell or cylinder provided at the ends with hubs in which said shafts are journaled, heads fixed on said shafts within said shell or cylinder, a spiral friction band connected adjacent to its ends with said heads and fitting in said shell or cylinder, and a bearing in which one of said hubs is journaled and supported independently of the shaft passing through it, between the shell or cylinder and the gears connecting said shaft with said drum.

8. In a load brake the combination of shafts arranged in axial alinement with each other, a friction shell or cylinder provided with ratchet teeth and at the ends with hubs in which said shafts are journaled, heads fixed on said shafts within said shell or cylinder, a spiral friction band fitted in said shell or cylinder and connected adjacent to its ends with said heads, and a bearing in which one of said hubs is journaled and supported independently of the shaft passing through it adjacent to said ratchet teeth and pawl.

In witness whereof we hereto affix our signatures in presence of two witnesses.

HENRY WEICKEL.
HERMAN E. FRENTZEL.

Witnesses:
  CHAS. L. GOSS,
  FRANK E. DENNETT.